United States Patent [19]

Beattie et al.

[11] Patent Number: 4,733,530

[45] Date of Patent: Mar. 29, 1988

[54] EMISSION CURRENT CONTROL SYSTEM FOR MULTIPLE HOLLOW CATHODE DEVICES

[75] Inventors: John R. Beattie, Westlake Village; Donald J. Hancock, Thousand Oaks, both of Calif.

[73] Assignee: Hughes Aircraft Company, Los Angeles, Calif.

[21] Appl. No.: 892,559

[22] Filed: Aug. 4, 1986

[51] Int. Cl.$^4$ ............................................. H05H 1/00
[52] U.S. Cl. .............................. 60/202; 315/111.21; 315/307; 315/294
[58] Field of Search ..................... 60/202; 315/111.21, 315/111.51, 111.61, 307, 308, 294, 297

[56] References Cited

U.S. PATENT DOCUMENTS

| | | | |
|---|---|---|---|
| 1,416,450 | 5/1922 | Churchward | 315/297 |
| 3,367,114 | 2/1968 | Webb | 60/202 |
| 3,757,518 | 9/1973 | Bahr | 60/202 |
| 3,909,664 | 9/1975 | Waskiewicz et al. | 315/111.21 |
| 4,090,106 | 5/1978 | Okumura et al. | 315/307 |
| 4,328,667 | 5/1982 | Valentian et al. | 60/202 |
| 4,575,658 | 3/1986 | Kay | 315/111.21 |

FOREIGN PATENT DOCUMENTS 160078  9/1984  Japan .................................... 60/202

OTHER PUBLICATIONS

Nedungadi et al, "A Precision Plasma Current Controller and a Rapid Sweep Electric Probe Characteristics Generator", *Indian Journal of Technology*, vol. 16, Jun. 1978, pp. 251-242.

Primary Examiner—Carlton R. Croyle
Assistant Examiner—Donald E. Stout
Attorney, Agent, or Firm—Terje Gudmestad; A. W. Karambelas

[57] ABSTRACT

An emission current control system for balancing the individual emission currents from an array of hollow cathodes has current sensors for determining the current drawn by each cathode from a power supply. Each current sensor has an output signal which has a magnitude proportional to the current. The current sensor output signals are averaged, the average value so obtained being applied to a respective controller for controlling the flow of an ion source material through each cathode. Also applied to each controller are the respective sensor output signals for each cathode and a common reference signal. The flow of source material through each hollow cathode is thereby made proportional to the current drawn by that cathode, the average current drawn by all of the cathodes, and the reference signal. Thus, the emission current of each cathode is controlled such that each is made substantially equal to the emission current of each of the other cathodes. When utilized as a component of a multiple hollow cathode ion propulsion motor, the emission current control system of the invention provides for balancing the thrust of the motor about the thrust axis and also for preventing premature failure of a hollow cathode source due to operation above a maximum rated emission current.

8 Claims, 3 Drawing Figures

EMISSION CURRENT CONTROL SYSTEM FOR MULTIPLE HOLLOW CATHODE DEVICES

The invention described herein was made in performance of work under NASA Contract No. NAS3-21943 and is subject to the provisions of Section 305 of the National Aeronautics and Space Act of 1958 (72 Stat. 435; 42 USC §245).

BACKGROUND OF THE INVENTION

Ion source devices, such as hollow cathode devices, are commonly used when it is desired to ionize a source material. The source material may be a gas, such as argon or xenon, or the vapor which results from heating a substance such as cesium or mercury. A hollow cathode device is formed typically of a hollow metallic tube which is in electrical contact with the negative terminal of a power supply. An electron current, in the form of an arc, flows between the hollow cathode and an electrode, or anode, which is connected to a positive terminal of the power supply. The gas or vapor source material passes through the hollow cathode and exits an end where it is ionized within the arc creating, in the case of mercury vapor, positively charged mercury ions and free electrons. The electron current flowing between the hollow cathode and the anode is known as the emission current of the cathode. The magnitude of the emission current is a function of several factors, two of which are the magnitude of the voltage of the power supply, and, the amount of source material available to be ionized.

One valuable application for hollow cathode devices is as a component of an ion propulsion motor, or ion thruster. One application of ion thrusters is for attitude control of satellites and other spacecraft. The thrust available from an ion thruster is typically significantly less than that available from traditional chemical propulsion motors, therefore limiting their use to the vacuum conditions found in space. However, their specific impulse, which is typically defined as the thrust per unit weight flow of exhaust gasses, is significantly higher than that of a traditional chemical propulsion motor, typically by as much as an order of magnitude. In other words, the fuel required for a given level of thrust weighs ten times less than the fuel required in a chemical impulse motor. Such significantly smaller fuel requirements make ion propulsion motors well suited for applications where low levels of thrust are acceptable over long periods of time. In an ion propulsion motor the gas or vapor fed to the hollow cathode is typically referred to as the propellant.

Below a certain level of thrust, a single hollow cathode device may be sufficient to provide the emission current required by the motor. However, as ion thrusters are scaled upwards to achieve larger amounts of thrust, a problem arises in that the emission current capacity of a single hollow cathode device may be exceeded. A proposed solution of this problem has been the inclusion of one or more additional hollow cathode devices within the ion propulsion motor, each device thereby contributing to the total emission current and, hence, thrust of the motor.

The use of more than one hollow cathode device, however, can create additional problems in the design and operation of a higher thrust ion propulsion motor.

One problem which is created is due to slight intrinsic differences between the hollow cathode devices. Such differences may result in the devices contributing unequally to the total output thrust of the motor. Thus, one of the devices may be operating at a higher emission current level than the others, which current level may exceed the maximum rated level of the device. Such an unbalanced mode of operation may result in one of the devices experiencing premature failure. In an essentially inaccessible vehicle such as a spacecraft, such a failure may have a significant and permanent detrimental effect on the overall operation of the spacecraft.

In addition to premature failure, the problem of unbalanced operation may have other serious consequences in an ion propulsion motor utilizing multiple hollow cathode devices. One such consequence is an asymmetry of thrust produced by the motor. In a single cathode motor, the cathode is placed on an axis coincident with the thrust discharge of the motor. In a multiple cathode motor, however, the individual cathodes are arrayed in a symmetrical pattern about the axis of thrust discharge. Thus it may be seen that if the emission currents from each of the cathodes are not balanced, the resultant thrust will not be balanced about the thrust axis, with potentially serious adverse effects on spacecraft maneuverability.

As may be appreciated, an important component of an ion propulsion motor utilizing hollow cathode devices is a cathode emission current control system. Typically, such a control system regulates the flow of propellant through each hollow cathode relative to the voltage potential between the cathode and the anode, this potential commonly being known as the discharge voltage. The amount of propellant passing through the cathode is normally inversely proportional to the magnitude of the discharge voltage. The actual method of regulation of the flow of propellant may vary depending on the type of propellant being used. For example, in a hollow cathode device utilizing mercury as a propellant, the mercury is typically vaporized by passing it through a heated, porous plug. By varying the plug heater current, and hence the temperature, a varying amount of mercury will be vaporized, thus increasing or decreasing the flow of propellant through the hollow cathode device.

While this emission current control system may be suitable for an ion propulsion motor utilizing a single cathode, it is unsuitable for a motor utilizing two or more cathode devices, in that the individual characteristics of each cathode are not compensated for. In accordance with the foregoing example, the heater plug current of each cathode is maintained at the same level for a given discharge voltage, thus causing a substantially equal amount of propellant to flow through each cathode. The result may be that one or more cathodes in a multi-cathode motor may produce a higher emission current than the other cathodes, depending on the individual characteristics of each cathode. This unequal emission current output results in the creation of the aforementioned problems of premature failure and unbalanced thrust about the thrust axis of the motor.

SUMMARY OF THE INVENTION

The foregoing problems are overcome and other advantages are provided by an emission current control system which, in accordance with the present invention, substantially equalizes the emission current from each of a plurality of electron source devices which are connected to a power supply. In one embodiment of the invention, a plurality of hollow cathode devices are independently connected to a negative terminal of a common discharge voltage power supply. A current sensor, one being associated with each device, generates an output signal which is proportional to current that each hollow cathode device draws from the power supply. This output signal is combined with a second signal, which has a magnitude proportional to the average current drawn by the plurality of cathode devices. A third signal resulting from this combination of first and second signals is applied to a heater or valve to control the flow of propellant through each of the plurality of cathode devices in proportion to the current drawn by each device. Additionally a fourth signal simultaneously controls the total flow of propellant through the plurality of devices, the total flow being controlled in inverse proportion to the magnitude of the discharge voltage. Thus the emission currents from each of the plurality of hollow cathode devices are substantially equalized with respect to the individual characteristics of each cathode and with respect to the magnitude of the discharge voltage.

BRIEF DESCRIPTION OF THE DRAWINGS

The foregoing aspects and other features of the invention are explained in the following description taken in connection with the accompanying drawings wherein.

DETAILED DESCRIPTION OF THE INVENTION

The emission current control system of the present invention will herein be described as embodied within an ion propulsion motor which utilizes vaporized mercury as a propellant, and an alternate embodiment may employ a gas such as argon or xenon. It should be understood that the invention may be utilized otherwise in other suitable applications wherein it is desirable that the emission currents of two or more electron sources be balanced. Likewise, although the system of the present invention will be described herein as a control system for hollow cathode devices, other suitable devices which ionize a gas or vapor may also be so controlled.

Figure 1:
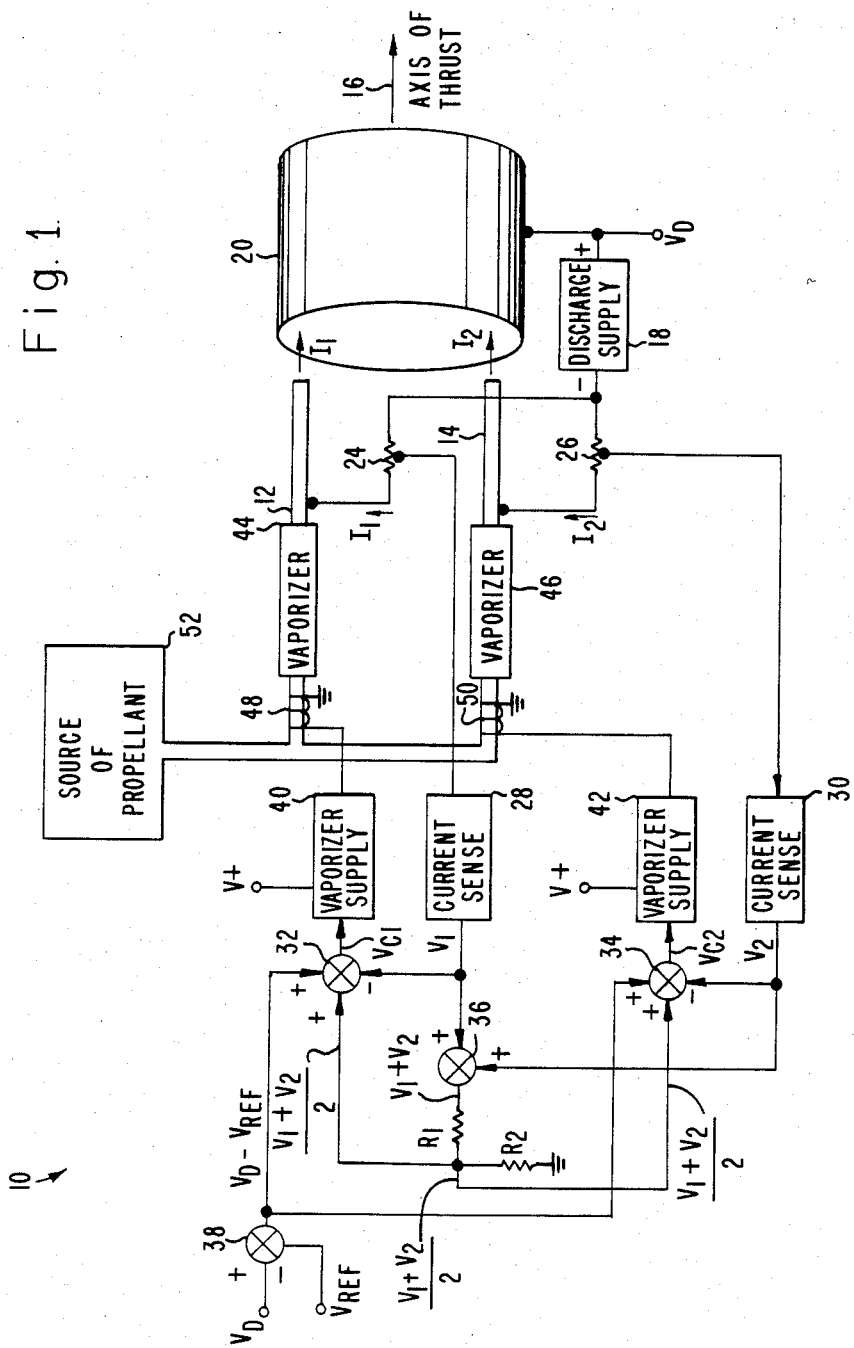
FIG. 1 is a block diagram of a dual hollow cathode system having an emission current control system which is an embodiment of the invention.

Referring to FIG. 1, there is shown in greatly simplified form a portion of an ion propulsion motor 10 having a first and a second hollow cathode device, 12 and 14 respectively, which are symmetrically disposed about an axis of thrust 16 of motor 10. Each of the devices 12 and 14 is in electrical contact with a negative terminal of a discharge power supply 18, the connection for each device 12 and 14 being made independently of the other. A positive terminal of supply 18 is in electrical contact with a cylindrical anode 20, which is disposed around the cathode devices 12 and 14. The magnitude of the voltage of power supply 18, generally designated as discharge voltage $V_D$, appears as a potential difference between each of the devices 12 and 14 and their respective anode 20. The magnitude of the voltage $V_D$ and the spacing between each cathode device 12 and 14 and the respective anode 20 is determined such that an electrical arc is maintained between each cathode and the anode. Thus, a current is caused to flow between each cathode and the anode, the current being known as the emission current and shown as $I_1$ and $I_2$. As may be appreciated, small intrinsic differences between cathode devices 12 and 14 will cause each device to operate with a different characteristic emission current.

In order to substantially egualize one to another the emission currents from each of the cathode devices 12 and 14, it is necessary to determine the respective magnitudes of each of the currents $I_1$ and $I_2$ that are drawn by each cathode 12 and 14 from power supply 18. This is accomplished in the invention by a first and second current sensor 24 and 26, shown as resistors, which are connected in series between each cathode device 12 and 14 and the cathode's independent connection with the negative terminal of power supply 18. Thus, the currents $I_1$ and $I_2$ drawn by each device 12 and 14 may be determined. It should be realized that current sensors 24 and 26 may be comprised of a variety of suitable types as is well known in the art.

The voltage drop across the resistors of the sensors 24 and 26 is suitably conditioned by first and second current sense circuits 28 and 30, respectively, which may comprise well-known operational amplifiers (not shown), to produce voltage signals $V_1$ and $V_2$. The magnitudes of voltages $V_1$ and $V_2$ are directly proportional to the magnitudes of currents $I_1$ and $I_2$.

Each of the voltages $V_1$ and $V_2$ are applied to first and second summers 32 and 34, respectively. Both $V_1$ and $V_2$ are also applied to summer 36, wherein the voltages $V_1$ and $V_2$ are summed together. The output of summer 36 is applied to a voltage divider, which in this embodiment of the invention is comprised of substantially equal valued resistors $R_1$ and $R_2$, whereby a voltage signal represented by the following equation:

$$\frac{V_1 + V_2}{2}$$

is produced at the junction of $R_1$ and $R_2$. This voltage is the average of $V_1$ and $V_2$ and, hence, represents the average magnitude of the current drawn by devices 12 and 14 from discharge supply 18. This average voltage is applied to both of the summers 32 and 34 to be subtracted from the voltages $V_1$ and $V_2$ applied to respective summers 32 and 34. Output signals of the summers 32 and 34 are used in the control of propellant flow as will be described hereinafter.

In order that the flow of propellant may also be controlled in proportion to the discharge voltage $V_D$, it is necessary to include the magnitude of $V_D$ as a term at each of the summers 32 and 34. In order to further provide a means to adjust the flow of propellant, a voltage signal $V_{REF}$ is subtracted from the magnitude of $V_D$ at a summer 38. The voltage signal $V_{REF}$ may be obtained by a number of different means, such as from the output of a wiper of a potentiometer if manual control is desired. If it is desired to control the flow of propellant by, for example, a computer, $V_{REF}$ could be outputted by a digital-to-analog converter circuit, as is well known in the art.

The output of summer 38, representing the voltage term $V_D - V_{REF}$, is applied to the input terminals of both summers 32 and 34 to be summed with the voltages $V_1$ and $V_2$. The output signals from the summers 32 and 34, shown as $V_{C1}$ and $V_{C2}$, respectively, are applied to first and second vaporizer supplies 40 and 42, respectively, for control of propellant flowing through each device 12 and 14.

As may be realized from the preceding description, the magnitude of $V_{C1}$ may be expressed by the following equation, namely:

$$V_{C1} = \left(\frac{V_1 + V_2}{2}\right) + V_D - V_{REF} - V_1$$

Likewise, the magnitude of $V_{C2}$ may be expressed by the following equation, namely:

$$V_{C2} = \frac{V_1 + V_2}{2} + V_D - V_{REF} - V_2$$

Thus, it may be seen that the magnitudes of the control voltages $V_{C1}$ and $V_{C2}$, as set forth above, will differ one from the other in proportion to the difference between the magnitudes of $V_1$ and $V_2$, which magnitudes are a function of the currents drawn by each device 12 and 14. If, for example, device 12 draws more current $I_1$ from discharge supply 18 than does device 14, the magnitude of $V_1$ will be greater than that of $V_2$. Therefore the magnitude of the corresponding control voltage $V_{C1}$ will be less than that of control voltage $V_{C2}$, which is the desired result in order to balance the magnitudes of the emission currents $I_1$ and $I_2$.

As was previously stated, the amount of propellant flowing through a hollow cathode is one factor which determines the emission current of that cathode. Therefore, in order to effectuate the balancing of emission currents $I_1$ and $I_2$ it is necessary to regulate the flow of propellant through first and second vaporizers 44 and 46, respectively. In this embodiment of the invention this is accomplished by regulating the current flow through first and second vaporizer heaters 48 and 50, respectively, by means of control voltages $V_{C1}$ and $V_{C2}$ and the first and the second vaporizer supplies 40 and 42 to which the voltages $V_{C1}$ and $V_{C2}$ are applied.

In operation, a source of propellant 52 provides a propellant, which in this embodiment of the invention may be mercury, to first and second vaporizers 44 and 46. Vaporizers 44 and 46 are formed typically of a porous refractory material, such as tungsten, which permits heating to a sufficiently high temperature by heaters 48 and 50 to vaporize the mercury. Mercury supplied to vaporizers 44 and 46 is vaporized by the high temperature encountered therein, thereby forming a vapor suitable to pass through hollow cathode devices 12 and 14. The aforementioned electrical arc which is maintained between each device 12 and 14 and the anode 20 ionizes the mercury vapor, thereby producing free electrons and positively charged mercury ions. These electrons and positive mercury ions pass into other regions (not shown in FIG. 1) of the ion propulsion motor where they are utilized to create a thrust from the motor.

Figure 2:
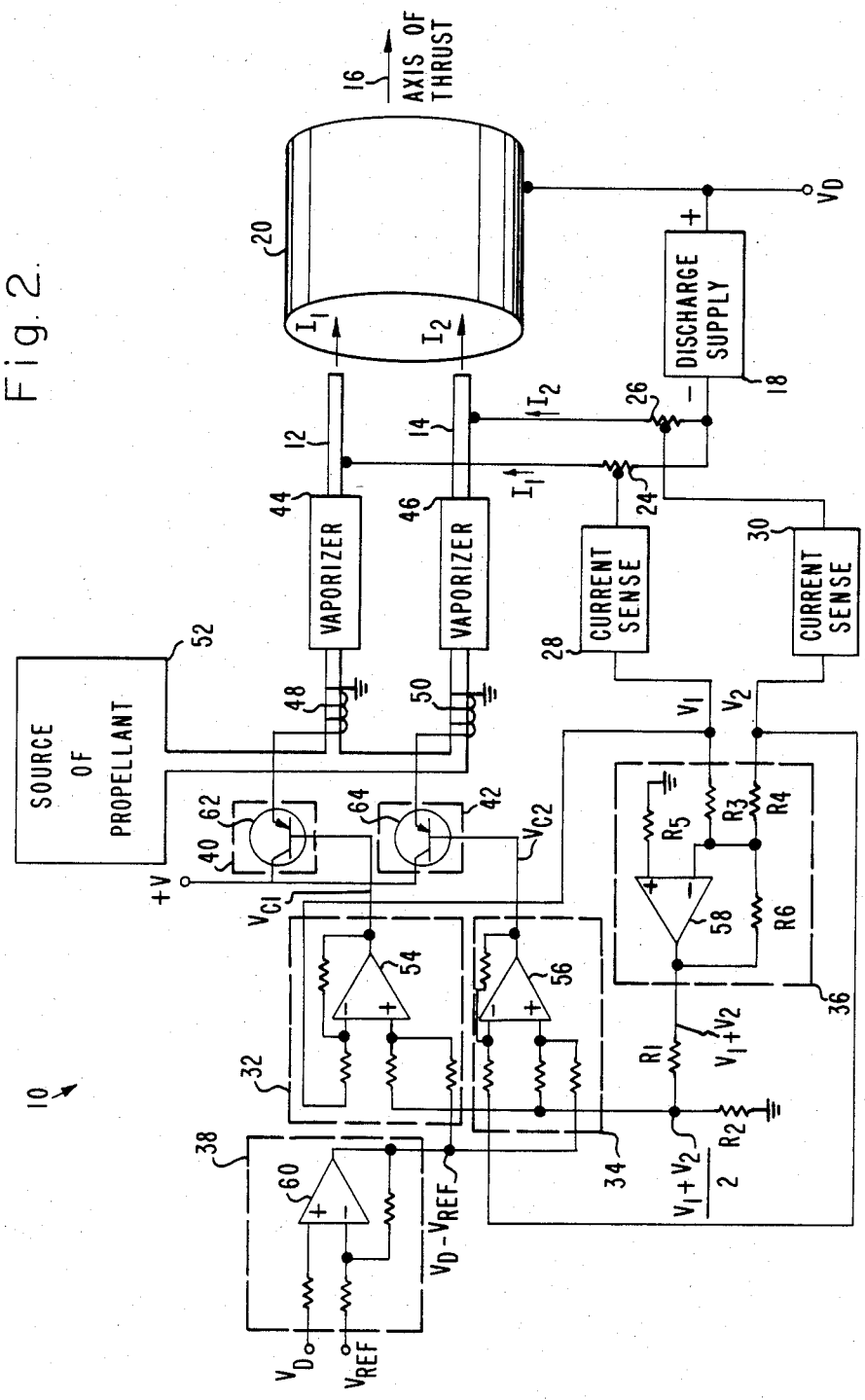
FIG. 2 is a block diagram, partially in schematic form, of the control system of FIG. 1.

Referring now to FIG. 2, the emission current control system of the invention is shown in greater detail. As shown, the summers 32, 34, 36, and 38 comprise an operational amplifier 54, 56, 58 and 60, respectively, each of which has a plurality of resistors connected to provide the functions of voltage summation.

Referring first to summer 36, voltages $V_1$ and $V_2$ are applied through resistors $R_3$ and $R_4$ to the inverting input of amplifier 58, thereby causing the voltages $V_1$ and $V_2$ to be summed together. The non-inverting input of amplifier 58 is connected through resistor $R_5$ to ground. The voltage appearing at the output of the amplifier 58 is connected through resistor $R_1$ and $R_2$ to ground. The voltage appearing at the output of the amplifier 58 is a function of the sum of $V_1$ and $V_2$ multiplied by the gain of amplifier 58 as determined by the ohmic value of feedback resistor $R_6$ relative to the ohmic values of resistors $R_3$ and $R_4$.

The operational amplifiers 54 and 56 of the summers 32 and 34 operate in a similar fashion, with the exception that the inverting input of each amplifier is connected through a resistor to one of the voltages $V_1$ or $V_2$. Thus the output of each amplifier represents the difference between the sum of the voltages applied to the inverting input and the voltage applied to the non-inverting input, multiplied by the gain of the amplifier as provided by the relative ohmic values of the feedback resistance to the input resistors.

The operation of amplifier 60 of summer 38 is similar to the operation of amplifiers 54 and 56 except that the non-inverting input has only one voltage applied, namely $V_{REF}$. Thus the output of amplifier 60 will be the difference between $V_{REF}$ and $V_D$, multiplied by the amplifier gain which is determined by the relative ohmic value of the feedback resistance to the value of the resistance connected to the inverting input.

The first and second vaporizer supplies 40 and 42, in this embodiment of the invention, comprise PNP transistors 62 and 64, respectively. The collector terminals of transistors 62 and 64 are connected to a source of heater power V+ and their respective emitter terminals are connected to vaporizer heaters 48 and 50, respectively. The base terminals of transistors 62 and 64 are driven by the amplifiers 54 and 56 of their respective summers 32 and 34 for control of the current flow through the transistors 62 and 64. The voltages $V_{C1}$ and $V_{C2}$ which are the respective outputs of amplifiers 54 and 56, by controlling the conduction of transistors 62 and 64, thereby regulate the flow of current through vaporizer heaters 48 and 50. Inasmuch as the temperature of a heater 48 and 50 is proportional to the current passing through the heater, it may be seen that the amount of mercury vapor produced by a vaporizer 44 and 46 is controlled by the magnitude of the voltages $V_{C1}$ and $V_{C2}$.

Figure 3:
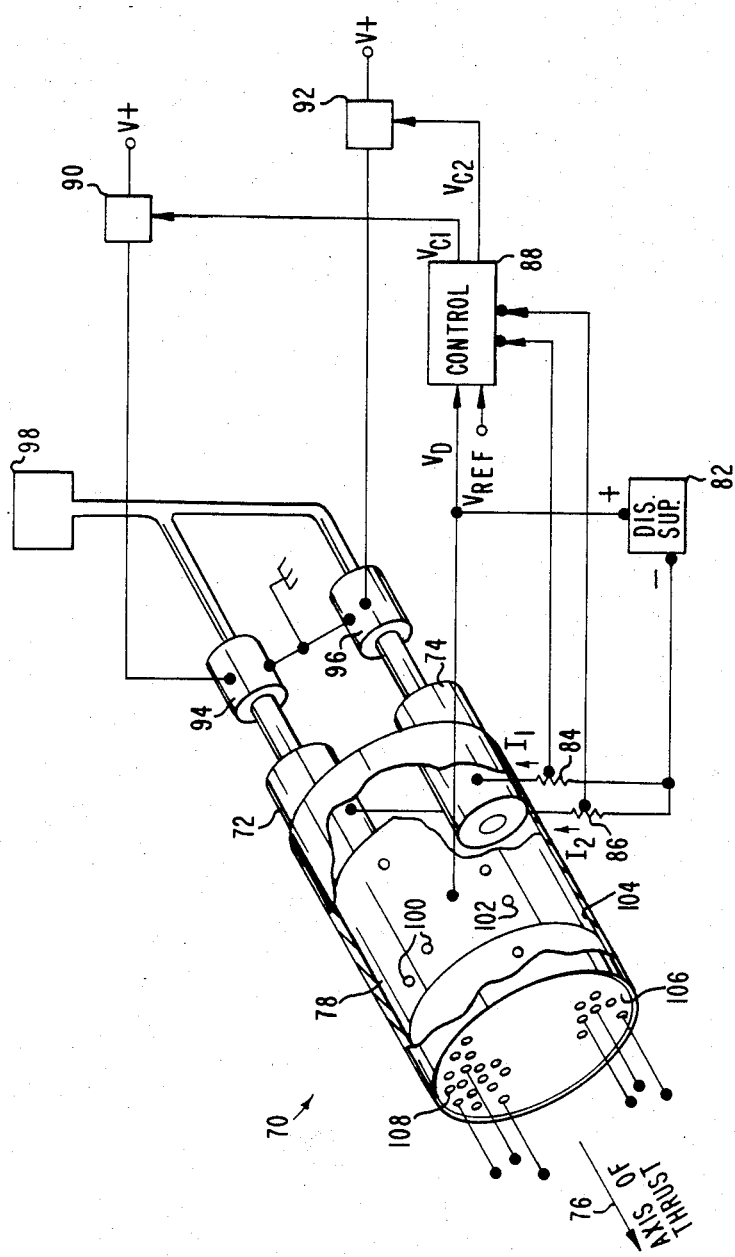
FIG. 3 is a stylized view of a dual hollow cathode ion propulsion motor incorporating the emission current control system of FIGS. 1 and 2.

Referring now to FIG. 3, there is shown in stylized form an ion propulsion motor 70 incorporating one embodiment of the invention. Motor 70 has two ionization devices, namely hollow cathodes 72 and 74, substantially symmetrically arranged about an axis of thrust 76. Disposed around the cathode 72 and 74 is a cylindrical anode 78. Each cathode is independently connected to a negative terminal of a discharge voltage power supply 82 through a respective current sensing resistor 84 and 86. A positive terminal $V_D$ of supply 82 is connected to anode 78 such that a potential difference exists between each cathode 72 and 74 and the anode 78 the potential difference resulting in current flowing therebetween. The currents so flowing, namely, $I_1$ and $I_2$, are sensed by resistors 84 and 86, each of which generates a voltage having a magnitude proportional to the current flowing therethrough. These voltages are applied to an emission current control system 88, as are the voltages $V_D$ and $V_{REF}$. The system 88, is comprised of summers 32, 34, 36 and 38, and current sense circuits 28 and 30 (not shown in FIG. 3), and operates as has been described above. System 88 has a pair of voltage control outputs, namely $V_{C1}$ and $V_{C2}$, which are applied to vaporizer supplies 90 and 92, respectively. Supplies 90 and 92 are controlled by $V_{C1}$ and $V_{C2}$ such that the heater currents drawn by their respective vaporizers 94 and 96 are regulated in proportion to the magnitude of $I_1$ or $I_2$, and also in proportion to the average magnitude of $I_1$ and $I_2$, as has been described above.

A propellant source 98, which may contain mercury or cesium, supplies propellant to vaporizer 94 and 96 to be vaporized therein. The amount of propellant vaporized by each vaporizer 94 and 96 is dependent on the heater current supplied by the respective vaporizer supplies 90 and 92. The vaporized propellant passes through hollow cathodes 72 and 74, where it is ionized within the arc which is maintained between each cathode 72 and 74 and the anode 78. The atoms of the vapor so ionized produce positively charged ions 100 and free electrons 102. The ions 100 produced in the main chamber 104 of the motor 70 are accelerated towards a grid 106 which is maintained at a negative potential by an acelerator power supply (not shown). Openings 108 within grid 106 permit a substantial number of ions 100 to pass therethrough, thereby escaping from motor 70 to produce a thrust. The kinetic energy of the accelerated ions 100 produces the thrust from motor 70, the thrust being coincident with the thrust axis 76.

It is to be understood that the above described embodiment of the invention is illustrative only, and that modifications thereof may occur to those skilled in the art. One such modification may be accomplished in an ion propulsion motor that utilizes, typically, argon or xenon gas as a propellant. In such a motor (not shown) the flow of propellant is regulated by $V_{C1}$ and $V_{C2}$ controlling the dimensions of an orifice within a gas flow control device. One such gas flow control device is a piezoelectric leak valve.

As may be appreciated, for each embodiment of the invention a number of factors, such as the type of propellant control devices utilized, the required magnitudes of the discharge voltage and emission currents, and the number of hollow cathode devices utilized will all affect the specific types, numbers of, and component values of the devices utilized to construct the emission current control system of the invention. Accordingly, this invention is not to be regarded as limited to the embodiment disclosed herein, but is to be limited only as defined by the appended claims.

What is claimed is:

1. A system for controlling the respective emission currents from a plurality of cathodes in accordance with an input signal comprising:
   a cathode power supply generating a supply voltage, said supply being conductively coupled to each of said cathodes by separate conductors for providing cathode current flows thereto;
   a plurality of current sensing means conductively coupled to respective ones of said conductors for sensing the respective cathode currents, each of said sensing means generating a sensing output signal which has a magnitude proportional to sensed cathode current;
   means for averaging whereby the magnitudes of said output signals are averaged, said averaging means generating an averaging output signal having a magnitude proportional to the average of said sensing output signals;
   reference potential means producing a reference output signal having a magnitude proportional to the difference between said supply voltage and said input signals;
   a plurality of flow regulator means each one of which is operably connected between a source of material to be ionized and a respective one of said cathodes for regulating a flow of said material through said cathode;
   a plurality of regulator control means each one of which has a control output signal the magnitude of which controls a respective one of said flow regulators, each of said regulator control means being responsive to the magnitudes of respective ones of said sensing output signals, and to said averaging output signal and said reference output signal.

2. A system as defined in claim 1 wherein said emission currents are controlled such that they are substantially equalized one to another.

3. A system as defined in claim 2 wherein said source material comprises mercury and said flow regulator comprises a vaporizer for vaporizing said mercury, said vaporizer having a heating means for varying the temperature thereof.

4. A system as defined in claim 3 wherein said control output signal controls said heating means so that the temperature of said vaporizer may be varied, thereby vaporizing more or less of said mercury.

5. A system as defined in claim 2 wherein said source material is a gas and said flow regulator is a piezoelectric flow controller having an orifice through which said gas flows, said orifice having an opening area which may be varied.

6. A system as defined in claim 5 wherein said control output signal varies said orifice opening to vary the amount of said gas which may flow therethrough.

7. A system as defined in claim 2 wherein said system is incorporated within an ion propulsion motor.

8. A system as defined in claim 7 wherein said source material is a propellant for said motor.

* * * * *